Figure 1:
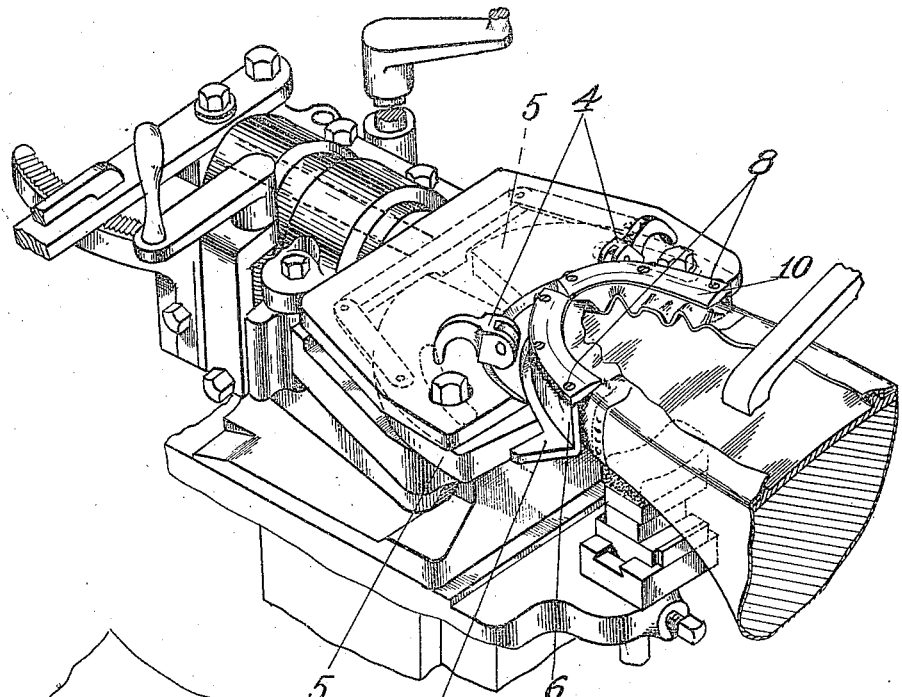

G. BERGMAN.
LASTING MACHINE.
APPLICATION FILED NOV. 19, 1910.

1,034,757.

Patented Aug. 6, 1912.

WITNESSES.
Elizabeth C. Coyle
Blanche Hargraves

INVENTOR.
Gustaf Bergman
By his Attorney,
Nelson W. Howard

UNITED STATES PATENT OFFICE.

GUSTAF BERGMAN, OF NATICK, MASSACHUSETTS, ASSIGNOR TO UNITED SHOE MACHINERY COMPANY, OF PATERSON, NEW JERSEY, A CORPORATION OF NEW JERSEY.

LASTING-MACHINE.

1,034,757. Specification of Letters Patent. Patented Aug. 6, 1912.

Application filed November 19, 1910. Serial No. 593,244.

*To all whom it may concern:*

Be it known that I, GUSTAF BERGMAN, a citizen of the United States, residing at Natick, in the county of Middlesex and State of Massachusetts, have invented certain Improvements in Lasting-Machines, of which the following description, in connection with the accompanying drawings, is a specification, like reference characters on the drawings indicating like parts in the several figures.

This invention relates to lasting machines and particularly to the end wipers of lasting mechanism of the "bed" type. In this type of toe lasting apparatus two or more wiper plates are jointed or butted together to present a continuous acting edge shaped to fit the toe end portion of the last which they are caused in their operation to embrace. The wipers and the last are usually moved relatively to wipe the upper up the side faces of the last and then the wipers are advanced and closed over the last bottom to lay the upper over the margin of the innersole to which it is secured in lasted position. In order that the upper shall be properly stretched about the last and wiped up without wrinkles the marginal portion of the upper materials is usually spread out over the top face of the wipers upon which it is held more or less to retard its slipping over the wipers as they are raised, or as the last is depressed.

An object of this invention is to provide a wiper that will facilitate this operation of spreading out the upper and wiping it up without wrinkles.

To this and other ends an important feature of this invention is found in a wiper that has its acting edge portion raised above its supporting and actuating devices. This arrangement allows the upper to be freely spread over the wiper alone without interference with the other parts.

A second feature of the invention consists in a wiper having a second edge face or corner spaced a short distance from the wiping edge and over which the upper can be spread down.

As herein shown, these features of the invention are embodied in a wiper from the foot or attaching portion of which is erected a substantially vertical riser that carries the narrow wiper proper. The wiper proper may be integral with or detachable from the riser and foot and its rear edge may be in a general way parallel with the front or wiping edge. The wiper proper thus constitutes a narrow curved plate upwardly, outwardly and then downwardly over which the upper may be folded or spread and drawn as the wiper is raised to stretch the upper and shape it up under tension about the last and over the margin of the innersole.

The features of the invention including certain details of construction will now be described in connection with the accompanying drawings and then pointed out in the claims.

Figure 2:
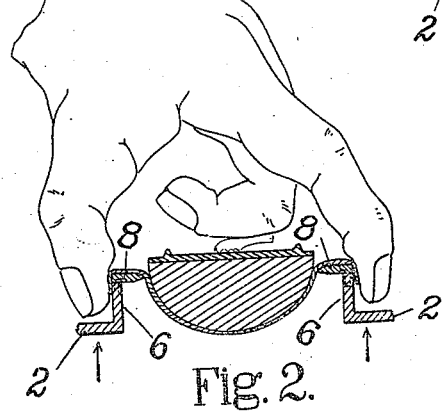
Figure 3:
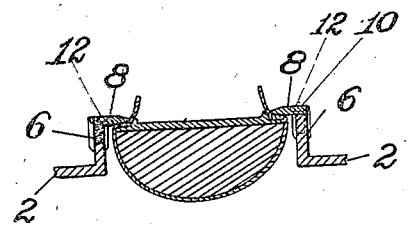

Figure 1 is a perspective view of so much of the toe lasting mechanism as is required for illustrating this invention; Figs. 2 and 3 are sections which show wipers in different positions.

The illustrated machine comprises the usual shoe supports and wiper carrying and actuating mechanism which in this instance is mounted for movement upwardly with relation to a stationarily held last. For the description of these portions of this machine reference may be had to printed British specification No. 22630/07. The wipers comprise the feet 2 which are slotted for connection by clamps 4 with the wiper actuating cams 5 which are cut away on their under sides to form seats which coöperate with the clamps 4 in rigidly holding the wipers. Heretofore the wiper has constituted a plain plate which projected in the same plane as the foot or attaching portion. In the illustrated embodiment of this invention the foot 2 supports a riser or vertical portion 6 from the top of which projects the wiper proper 8 in a plane substantially parallel with the foot 2 and with the cam plate 5 but spaced well above those parts. This allows the upper to be spread out without engagement with the clamps or the cam plates or other parts of the machine. The width of the plate 8 is, preferably, such that the upper may be spread down over its rear edge or corner 10 where it can be conveniently held by the hand or fingers of the operator to retard or delay the slipping of it as the wipers are raised to stretch and form it.

The wiper 8 may be detachably fastened to the riser 6 by screws 12 to facilitate manufacture and also the exchange of wipers for use with different shapes of lasts which has frequently to be made.

Having explained the nature of my invention and described a construction embodying it in the best form now known to me I claim as new and desire to secure by Letters Patent of the United States:—

1. In a lasting mechanism for drawing an upper upwardly around the toe of a last and then wiping it inwardly over the last bottom, a plurality of wiper plates having curved edges and presenting a continuous rubbing edge shaped to fit and embrace the toe end portion of a last, and supporting and operating means by which the plates are raised and moved forwardly and turned inwardly to lay the upper over the end and sides of the toe, said plates being shaped to extend upwardly from their supporting means and then forwardly therefrom to present their upper engaging portions over which the upper to be updrawn and overwiped may be outspread, in a plane which is located a substantial distance above said supporting means.

2. In a lasting mechanism for drawing an upper upwardly around the toe of a last and then wiping it inwardly over the last bottom, a plurality of wiper plates having curved edges and presenting a continuous rubbing surface shaped to fit and embrace the toe end portion of a last, and supporting and operating means by which the plates are raised and moved forwardly and turned inwardly to lay the upper over the end and sides of the toe, said wiper plates presenting plane top faces extending from their edges backwardly, and downwardly directed faces which form with said top faces an angle over which the upper to be updrawn and overwiped may be outspread and held by the fingers of the operator, said plates having attaching portions in the rear of the downwardly directed faces.

3. A toe lasting mechanism arranged for drawing an upper upwardly around the toe of a last and then wiping it inwardly over the last bottom having, in combination, wiper supporting means, toe wiper plates arranged to embrace the toe below the last bottom and have the margin of the toe portion of the upper outspread over them, said plates being mounted to move forwardly and to swing inwardly and comprising an attaching portion located in the plane of the supporting means and an acting portion connected to the attaching portion and spaced a substantial distance above the attaching portion and the supporting means, for the purpose described.

4. A machine of the class described having, in combination, wiper supporting means, wiper fastening clamps, and a wiper plate having an attaching portion and formed to present its acting edge in a plane located a substantial distance above the attaching portion and said clamps.

5. An end lasting mechanism comprising toe embracing wipers each having an attaching portion, a riser erected thereon and a narrow wiping portion carried by the riser and having its inner edge shaped to fit the last and its outer edge shaped and arranged to allow the upper to be spread down over said outer edge preparatory to relative movement of the wiper and the last for stretching the upper in the lasting operation.

6. Articulated toe embracing wipers for an end lasting mechanism each comprising an attaching foot and a riser and a detachable wiping portion mounted on the riser in a plane above the attaching foot and having an acting edge shaped to embrace one half of the toe of a shoe.

7. Articulated toe embracing wipers for an end lasting mechanism each comprising an attaching foot and a wiping portion 8 having an inner edge shaped to embrace one half of the toe of a shoe and a narrow top face and an outer edge 10, said parts being arranged to permit the upper to be spread outwardly over said top face and downwardly over said edge 10.

In testimony whereof I have signed my name to this specification in the presence of two subscribing witnesses.

GUSTAF BERGMAN.

Witnesses:
E. COEY,
H. G. ADAMS.

---

Copies of this patent may be obtained for five cents each, by addressing the "Commissioner of Patents, Washington, D. C."